No. 887,079. PATENTED MAY 12, 1908.
T. EYNON.
MILLING CUTTER.
APPLICATION FILED JULY 20, 1905.

Inventor
Thomas Eynon,
By Mason Fenwick & Lawrence,
his Attorneys.

Witnesses
B. Hotchkiss.
A. M. Trogner

UNITED STATES PATENT OFFICE.

THOMAS EYNON, OF CHICAGO, ILLINOIS.

MILLING-CUTTER.

No. 887,079.   Specification of Letters Patent.   Patented May 12, 1908.

Application filed July 20, 1905. Serial No. 270,554.

*To all whom it may concern:*

Be it known that I, THOMAS EYNON, a citizen of the United States, residing at Chicago, in the county of Cook and State of Illinois, have invented certain new and useful Improvements in Milling-Teeth; and I do hereby declare the following to be a full, clear, and exact description of the invention, such as will enable others skilled in the art to which it appertains to make and use the same.

This invention relates to improvements in milling devices.

It has been common heretofore to construct the teeth of a milling head of superior quality of steel which is necessarily expensive and by the present invention I propose to reduce the expense by constructing only the cutting part of the teeth of the expensive material while that part employed for wedging or otherwise fixing the teeth in the head may be made of inferior quality of material. This object may be carried out in numerous ways as will be obvious from the illustrations in the accompanying drawings forming a part of the specification, in which:—

Figure 2:
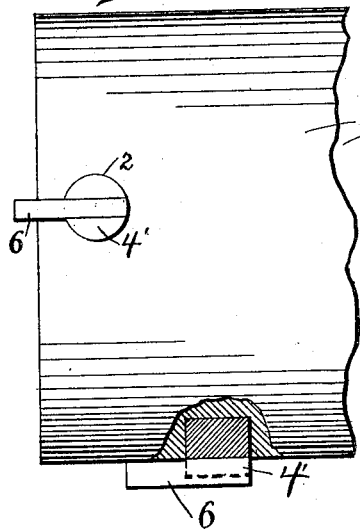
Figure 1:
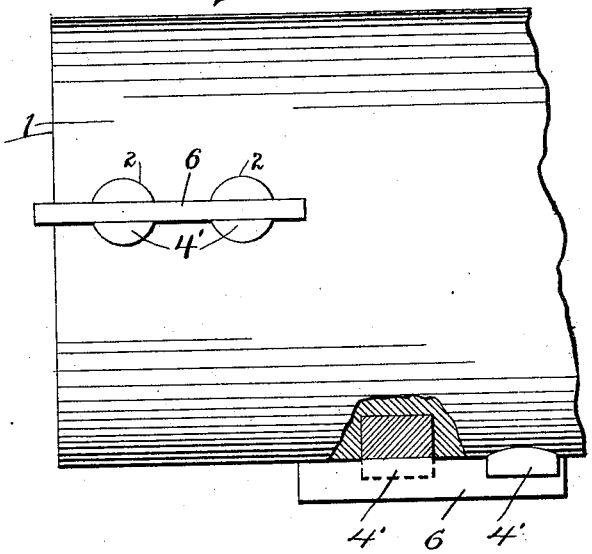
Figure 3:
Figure 4:
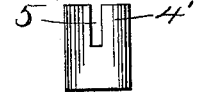

Figure 1 is a side elevation of a milling head showing a cutting tooth applied thereto in accordance with the present invention. Fig. 2 is a similar view showing another method of applying the cutting tooth to the milling head. Fig. 3 is a top plan view of one of the retainers employed in securing the cutting teeth to the milling head. Fig. 4 is a side elevation of one of the retainers.

In the constructing of milling teeth it has been common to form the same rectangular or polysided in transverse section, but the forming of a milling head with apertures of a corresponding shape has been more or less difficult and it is found much easier to provide cylindrical openings for the reception of milling teeth so that it has become common to utilize a cylindrical steel rod of superior quality for forming the milling teeth and in order to provide a cutting edge, the rod has usually been split longitudinally, centrally, and a portion of one of the halves removed so that the other half is exposed with its squared edge. This, it will be seen, involves the best quality of steel for the entire body, and, as said steel is comparatively expensive, it is believed to be decidedly beneficial to provide for the saving of a portion of the material used, and by the present invention I propose to save at least one-half or more of the more expensive material. This result is attained in the simplest and most generic form by the use of elements such as are indicated in Figs. 1 and 2 in which 1 indicates any ordinary milling head formed with cylindrical apertures 2, said apertures being filled by retaining members 4'. These retaining members 4' have a cylindrical formation so as to fit accurately within the above-mentioned apertures 2 formed in the milling head, the outer ends of the retaining members projecting beyond the surface of the milling head and being provided with the notches or slots 5 within which the cutters 6 fit. In the preferred form of the invention shown in Fig. 1, the apertures 2 are formed in pairs arranged longitudinally with respect to the axis of the milling head, and each pair of the retainers fitting within the apertures is designed to hold one of the cutters 6 in position. In the construction shown in Fig. 2 a single retainer is employed in connection with each of the cutting members 6 and the said cutting members may project beyond the end of the milling head, as is clearly indicated in the drawings. Thus it will be seen that while cylindrical openings are provided which are the most easily produced in a milling head, the cutting portion proper of the tooth may be of the ordinary flat material and the expensive cylindrical material, heretofore used, may be dispensed with entirely.

What I claim is:—

1. The combination with a milling head formed with a series of apertures, of a retaining member within each of said apertures, a portion of each retaining member projecting beyond the milling head and being slotted, and cutting teeth fitting within the notched portions of the retainers.

2. The combination with a milling head, formed with pairs of apertures extending partially through said head, of a notched or slotted retainer in each of said apertures resting on the bottom thereof, and a tooth connecting said retainers of each pair and filling the notches or slots therein.

3. The combination with a milling head formed with a cylindrical opening extending partially through said head, of a cylindrical retainer positioned within said opening and resting on the bottom thereof and a tooth engaged by said retainer and extending over the end of said milling head.

In testimony whereof I affix my signature in presence of two witnesses.

THOMAS EYNON.

Witnesses:
PETER BERINGER,
FRANCIS H. DAIS.